Figure 1:
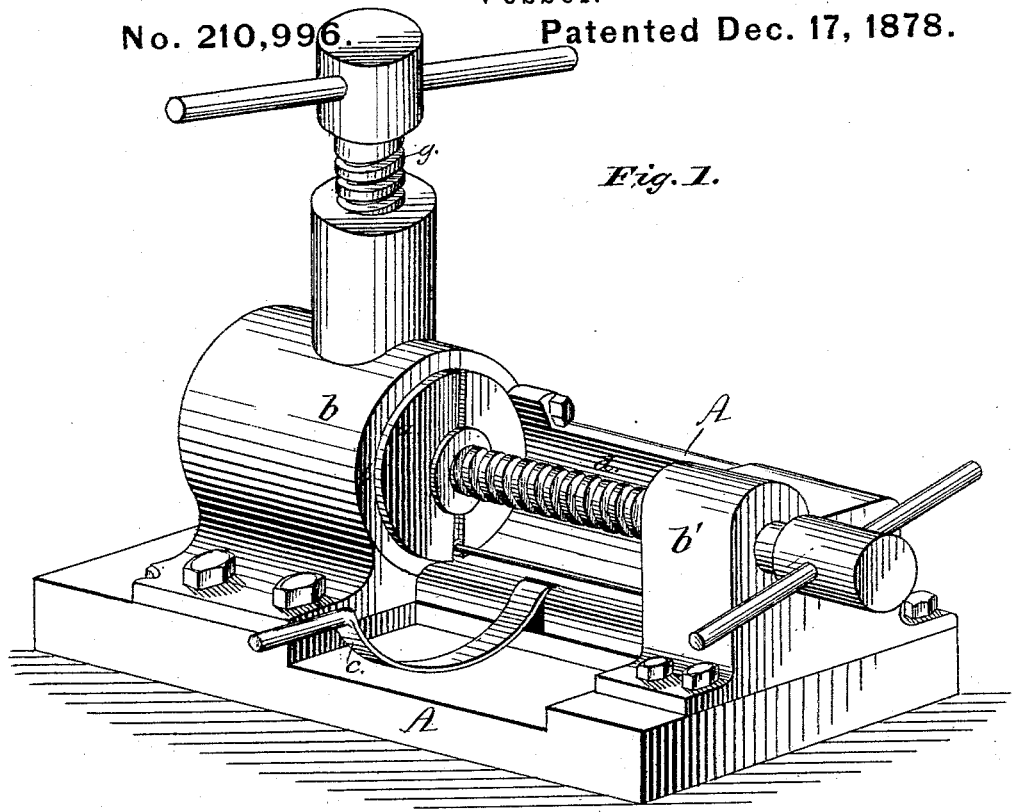

T. W. CREES.
Machine for Shaping and Ornamenting Sheet-Metal Vessel.

No. 210,996. Patented Dec. 17, 1878.

Witnesses:
T. C. Brecht
A. H. Norris

Inventor:
Thomas W. Crees
By James L. Norris.
Attorney.

T. W. CREES.
Machine for Shaping and Ornamenting Sheet-Metal Vessel.

No. 210,996. Patented Dec. 17, 1878.

Witnesses:

Inventor:
Thomas W. Crees,
By James L. Norris.
Attorney.

UNITED STATES PATENT OFFICE.

THOMAS W. CREES, OF BIRMINGHAM, ENGLAND.

IMPROVEMENT IN MACHINES FOR SHAPING AND ORNAMENTING SHEET-METAL VESSELS.

Specification forming part of Letters Patent No. 210,996, dated December 17, 1878; application filed July 11, 1878; patented in England, March 21, 1878.

*To all whom it may concern:*

Be it known that I, THOMAS WALTER CREES, of Birmingham, England, have invented new and useful Improvements in Machines for Shaping and Ornamentation of Metals, for the manufacture of coffee or other urns and pots, basins, jugs, articles of jewelry, and the like, and for similar purposes, of which the following is a specification, reference being had to the accompanying drawing.

This invention relates to machines for shaping and ornamenting metals, such as gold, silver, German silver, brass, copper, Britannia metal, or other metal or alloys thereof, the same being especially applicable for use in the manufacture, shaping, and ornamenting of tea and coffee urns and pots, sugar-basins, cream, water, claret, and other jugs; whip, walking-stick, and umbrella mounts and collars; the shells of balance-weights and other ornaments; chandeliers, knobs for metal bedsteads, and articles of jewelry, such as ear-drops and lockets, and other articles formed of thin sheet metal, and to which it is desirable to impart a variety of shapes or forms, and whose surface is to be plain or ornamental, and either in relief or grooved or depressed.

According to my invention I give the desired outline or shape to any article, and also form the same with any desired device, pattern, or ornamentatal surface by one operation, as follows: I form a mold of two or more parts, accurately mitered or fitted together, and its interior I make of the shape desired to be given to the article to be operated upon. I also produce on it the pattern or device which it is desired to transfer to the article being manufactured. I mount this mold in a screw or other press, or other suitable mechanical contrivance, by which a steady pressure can be imparted or communicated thereto, and I insert the metal blank intended to form the article into the mold; but before thus inserting the blank I fill or charge it with water or other liquid, or any suitable pliable substance or composition, which, when the blank is placed in the mold, I seal by a washer of leather, thin metal, or other suitable material, which forms a water-tight bearing for a plunger attached to the screw or other power employed to produce the pressure. By these means, as the screw or other mechanical contrivance is actuated, the liquid or pliable substance or composition being sealed by the said leather or metal washer, and thus kept from escaping, is compressed or displaced, and forces the thin metal of the blank to take the formation or configuration of the mold around it, and simultaneously, or otherwise, to have impressed upon or depressed into its outer surface or superficies the pattern, device, or ornament which was made upon the mold's interior surface.

The advantages of this method of operation will be at once apparent to those acquainted with existing systems or methods of forming or shaping and ornamenting such articles, the main advantage of my improved method being the increased rapidity of production, which economizes the cost of production.

The drawings represent an ordinary press capable of operating as required for the purposes of my invention.

Figure 2:
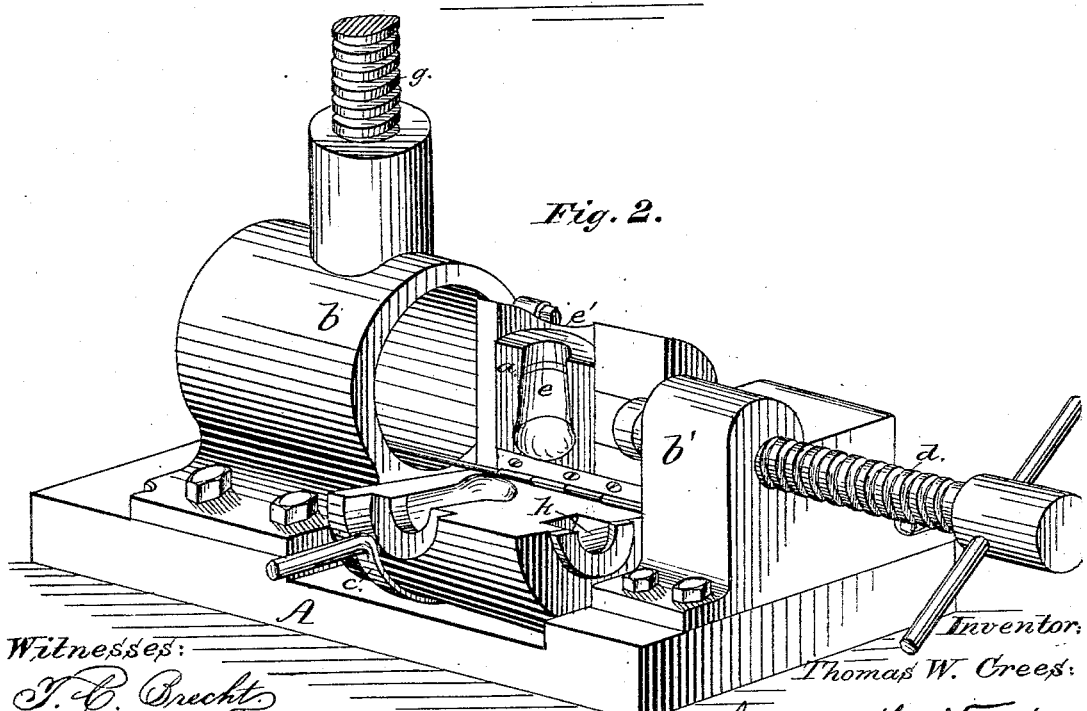
Figure 3:
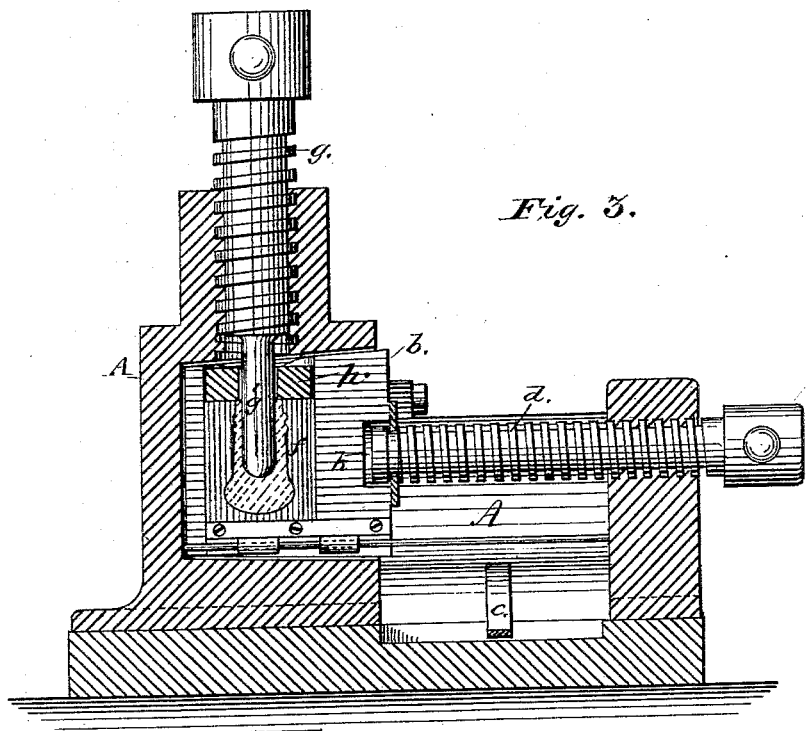
Figure 4:
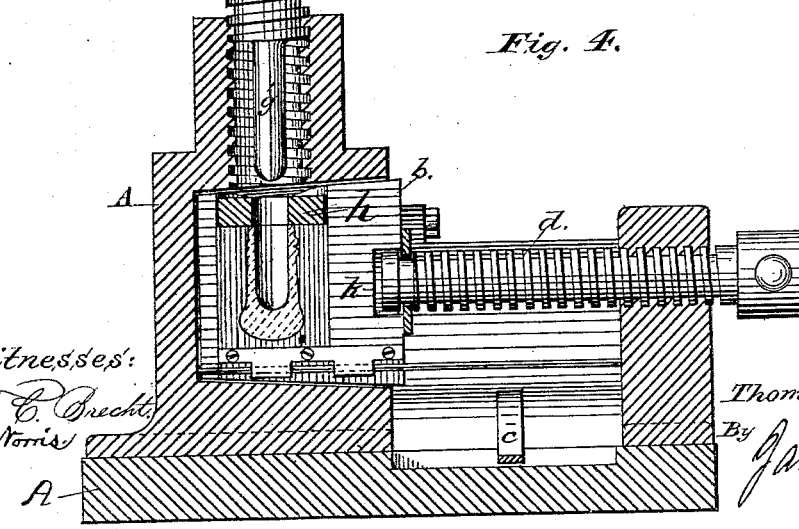

Figures 1 and 2 are perspective views. Figs. 3 and 4 are longitudinal sectional views.

Like letters indicate the same parts throughout the drawing.

$a$ is a circular block mounted in the frame A. In Fig. 1 one end of the said block has entered the upright piece $b$. $c$ is a lever or cramp, which arrests the sudden fall of the block when opened to allow the insertion of the molds, or the introduction into the molds of the metal to be operated upon to form an article. When the said block is closed sliding motion is imparted to it by means of a plunger, $d$, which is screw-threaded, and has a shouldered end setting in a recess, $k$, in the divided block $a$, in such manner as to carry the block with it when the plunger is screwed back and forth in the upright $b'$.

In Fig. 2 the block, which is divisible in two halves or pieces, is shown open, with the parts or pieces of metal or other suitable material which constitute the mold $e$, for the reception of the metal to be operated upon to form an article. This mold may be fitted in any convenient manner for effectual working, and may be readily removed and replaced. The metal is fed into the mold at the mouth $e'$ when the block $a$ is closed, and when opened for the removal of the article which has been subjected to the operation one part of the said block lies in the cramp $c$, as shown.

The sectional view, Fig. 3, shows the position of the article to be operated upon in the mold at $f$. Connected with the screw $g$ is a plunger, $g'$, above the opening in the block and mold. When the screw is actuated by downward pressure the end of the plunger enters the metal blank $f$, and advances gradually until the shape and ornamentation of the article are perfect or complete. The completion of this operation may be easily ascertained by the operator.

In Fig. 4 the plunger is shown out of the mold.

$h$ is the aforesaid washer for sealing the said article, and preventing the escape of the liquid.

The plunger is withdrawn from the newly-formed article by means of the vertical screw, and the block is withdrawn by means of the longitudinal plunger $d$. The block is opened, one part falling into the lever or cramp to permit the release of the article which has been shaped and ornamented, and then another piece is placed in the mold to be similarly shaped and ornamented.

What I claim is—

The combination of parts comprising the block $a$, mold $e$, the upright $b$, the horizontal screw $d$, the vertical screw $g$, and the plunger $g'$, fitted in any suitable press, and operating as above set forth, and for the purpose specified.

THOMAS WALTER CREES.

Witnesses:
 JOHN KENDRICK,
10 *Pigott St., Birmingham, England.*
 JOHN YORK,
80 *Great Colmore St., Birmingham, England.*